Oct. 24, 1939.  O. A. ROSS  2,177,151
MOTOR VEHICLE AND CONTROL APPARATUS THEREFOR
Filed Feb. 5, 1936  2 Sheets-Sheet 1
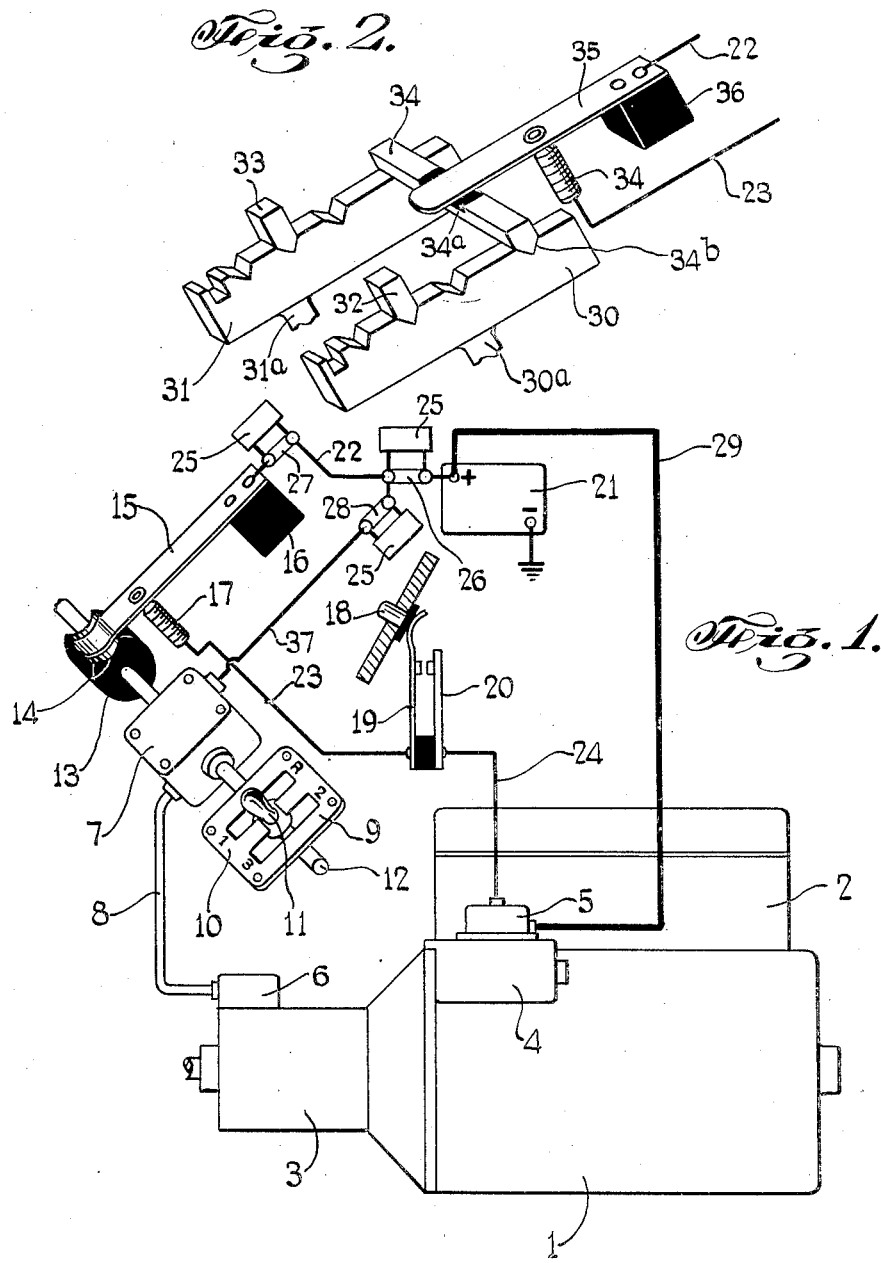
INVENTOR
Oscar A. Ross.

Oct. 24, 1939.   O. A. ROSS   2,177,151
MOTOR VEHICLE AND CONTROL APPARATUS THEREFOR
Filed Feb. 5, 1936   2 Sheets-Sheet 2
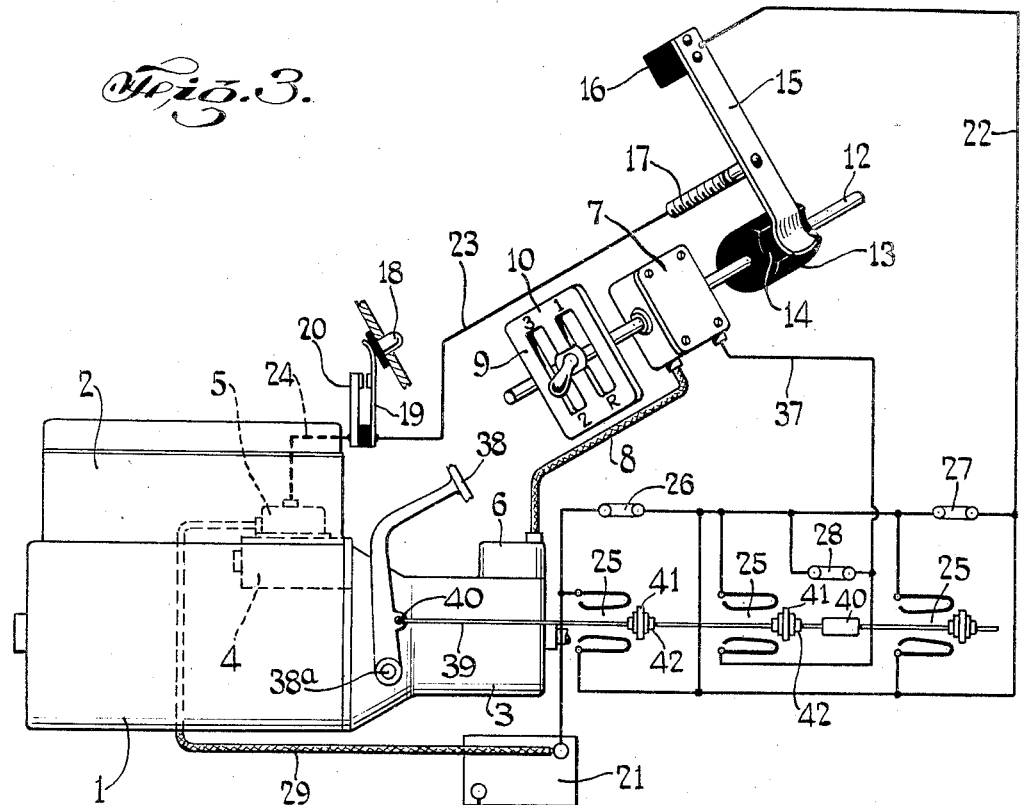
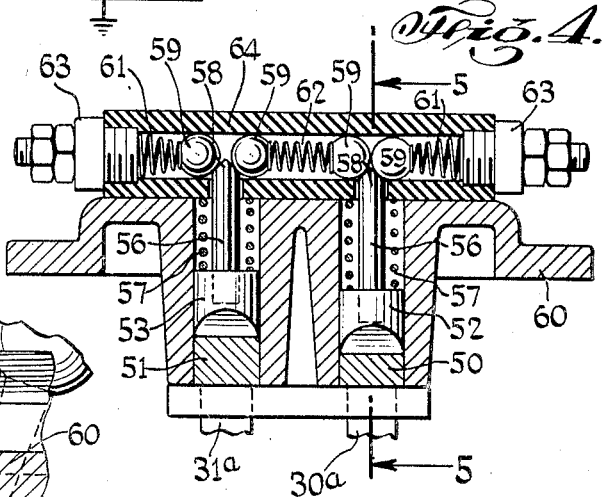
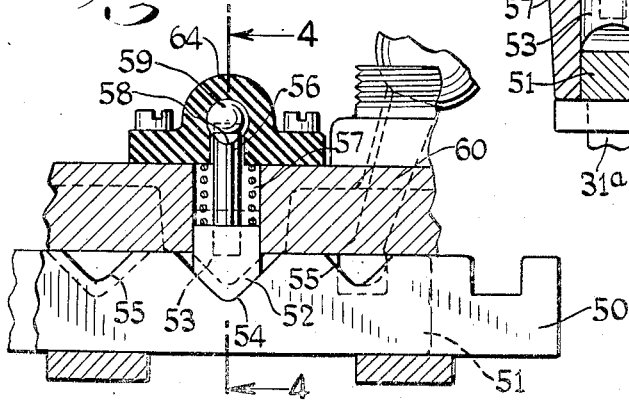
INVENTOR
Oscar A. Ross.

Patented Oct. 24, 1939

2,177,151

UNITED STATES PATENT OFFICE 2,177,151

MOTOR VEHICLE AND CONTROL APPARATUS THEREFOR

Oscar A. Ross, New York, N. Y.

Application February 5, 1936, Serial No. 62,429

11 Claims. (Cl. 290—28)

The invention relates to motor driven vehicles and systems of control of the power units thereof and more particularly to that type employing variable speed transmissions between a motor and the driving wheels of said vehicles.

If the driver of the ordinary motor vehicle, or car attempts to start the engine, or motor thereof with the clutch engaged and the transmission in gear, a severe strain is placed both upon the starting motor and the battery supplying energy thereto since in starting said motor must not only start the engine but also move the car. This strain may strip the starter teeth and/or buckle the plates of the battery, in any event it will produce a severe drain on said battery. To prevent this detrimental effect this invention comprehends partially interrupting the starter circuit automatically whenever the gear selector, or gear shift lever is moved out of the neutral position and automatically establishing said partial interruption when said levers are moved to the neutral position, and said partial automatic interruption may also include additional partial interruption by engagement of the clutch pedal as disclosed in my Patent 1,373,099, and said invention may be applied to either manual, semi-automatic or full automatic transmissions wherein the gear ratio or speed ratio between the engine and the driving wheels is varied as required for varied driving conditions.

Other advantages of this invention will be apparent as the description thereof progresses and the novel and peculiar features thereof are pointed out in the specification and claims, and wherein:

Figure 1 is a part diagrammatic, part perspective view of one form of the invention as applied to a semi-automatic variable speed transmission, and Fig. 2 is a part perspective view of a vehicle wherein the invention has been applied to a manually operated gear shift, and Fig. 3 is a modified form of the system shown in Fig. 1, and Fig. 4 is a part sectional modified view of the form of control shown in Fig. 2, and is taken on line 4—4 of Fig. 5, and Fig. 5 is also a part sectional view of the same taken on line 5—5 of Fig. 4.

Referring to Fig. 1, disclosing a motor vehicle in part including a semi-automatic gear shift, power unit 1 comprises in part hydrocarbon motor 2, gear shift transmission 3, starting motor 4, and magnetically operated starting switch 5 arranged to supply energy to said starting motor. Gear shift 3 is assumed to have its gear ratios varied by remote control apparatus comprising electric or pneumatic or electro-pneumatic, or other power operated gear shifter unit 6 preferably forming a part of said gear shift 3, unit 6 being connected to circuit controller unit 7 by conductor cable 8. Said remote control apparatus further comprises manual gear or speed selector switch unit 9 located adjacent the driver and may be secured to the steering post or the dash and includes H plate 10 into the slots of which manually operated selector lever 11 may be moved to select desired gear or speed ratios, said lever being shown in the neutral or no driving position. Said H plate is of conventional form as employed for three speed forward and one speed reverse transmissions and it is to be understood that when said selector lever is moved from its neutral position to any one of the four slots branching therefrom, a correlated gear ratio is established by power operated unit 6 in transmission 3, as more fully described in my Patent 1,373,099, issued March 29, 1921.

Gear selector lever 11 is fixed on shaft 12 which also operates the circuit controller mechanism in circuit controller unit 7, and said shaft also carries a cam member 13 rotated thereby, said member having a groove 14 into which the free end of circuit controller or lever 15, supported by fixed insulating member 16, is arranged to enter to partially close a circuit through contact post 17 when the selector lever 11 is in its neutral position.

Preferably mounted on the dash of the car is starter push button 18 adapted to move circuit controller 19 into engagement with fixed contact 20 for closing the starter circuit if not otherwise interrupted as more fully hereinafter described, the closing of said circuit acting to operate magnetically operated starter switch 5 for energizing starter motor 4.

Referring to Fig. 2, disclosing a modified form of the invention wherein a manually operated gear shift is employed, gear shift members 30 and 31 having gear shifter extensions 30a and 31a are assumed to be slidably mounted in the gear box (not shown) and conventional dogs 32 and 33 are assumed to position said members in their neutral position as shown, said members 30 and 31 being modified to include extensions having dog notches 34b for receiving the opposite ends of a rocking dog member 34 suitably guided for rocking movement, the raising of either end of which will raise the free end of resilient circuit controller 35 supported by fixed insulating member 36. Movement of either gear shifter members 30 or 31 to the right or left for selecting gear ratios will act to raise one or the other end of rocking dog member 34 thereby raising the free end of circuit controller 35 by means of insulated portion 34a, whereby a circuit to fixed contact post 34 is opened, as more fully hereinafter described.

Operation of Fig. 1

When the gear selector lever 11 is in neutral position as shown, a circuit from battery 21 to the magnetically operated starting switch 5 may be established by depressing the starter button 18, said circuit comprising battery 21, switches 26, 27 and wire 22, circuit controller 15, contact post 20, wire 24, starting switch 5 to ground and thence to said battery. Upon energizing said starter switch energy is supplied from said battery to starter motor 4.

If however gear selector lever 11 has been moved into a slot for selecting a desired gear ratio between the engine and the driving wheels, the rotation of insulated cam 13 will raise the free end of circuit controller 15 and the starter circuit above described will be only partially closed upon depressing starter button 18 and therefore the starter motor cannot be energized to start engine 2.

The circuit breaking device including circuit controller 15 and contact post 17 is preferably included in the housing 7 being shown exterior thereof for more ready understanding in the invention. Likewise the similar circuit breaker shown in Fig. 2, is preferably enclosed in a housing secured to or made a part of the transmission 3.

It is to be understood that gear shifting members 30 and 31 are shifted by means of a conventional gear shift lever forming a part of a conventional gear shift unit.

Magnetic starting switch 5 when energized supplies energy from battery 21 to self starter 4 through conductor 29.

Referring to Fig. 3, showing a modified form of the invention shown in Fig. 1, and wherein the operation of the clutch connecting the motor 1 and transmission 3 is arranged to operate switches for additionally controlling the starter circuit, as disclosed in my Patent No. 1,373,099, hereinbefore named, clutch pedal 38, pivoted at 38a, forming part of the power unit comprising said motor 1 and transmission 3, is arranged to reciprocate rod 39 for operating the several switches 25 during the engagement and disengagement of the clutch by said pedal 38, the disengaging action acting to close said switches 25 and the engaging action acting to open said switches, the nuts 42, adjustable on rod 39, acting to adjustably position contacts 41 for adjustably opening and closing said switches.

Operation of Fig. 3

With all the switches as 26, 27 and 28 closed, the operation of the system will be the same as described for Fig. 1. If switch or circuit controller 26 is opened, and circuit controllers 27 and 28 are maintained closed, and assuming it is desired to start the motor 1, it will now be necessary to also disengage the clutch by depressing clutch pedal 38 thereby closing the switches 25 additionally to closing the starter circuit through contact lever 15 and contact 17, when the starter button 18 is depressed for starting the motor 1. Furthermore although the circuit controller 28 is closed it will be noted that energy for operating the power operated gear shifting unit 6, will also be dependent upon the disengagement of the clutch, the left hand clutch operated switch 25 controlling the energy flow to both the unit 6 and the starter switch 5.

If switch 26 now be closed and switch 28 opened, it will be possible to start the motor 1 upon depressing the starter button 18 but without disengaging the clutch, however no gear shifting can be accomplished until said clutch is disengaged for completing the circuit to gear selector switch box 7 and power operated gear shifter unit 6, the circuit being completed through the intermediate clutch operated switch 25 as the clutch is disengaged upon depressing pedal 38.

If now circuit controllers 26 and 28 are closed and circuit controller 27 opened, motor 1 cannot be started without depressing clutch pedal 38, but gear shifting may be effected without disengaging said clutch as energy to units 7 and 6 are not dependent upon a clutch operated switch 25.

Referring to Figs. 4 and 5, showing a modified form of control of the starter circuit by gear shifter members similar to those disclosed in Fig. 2, the gear shifter members 50 and 51, having gear shifting extensions 30a and 31a, are slidable in parallel slots or grooves formed in cover 60 arranged to be secured to the top or side of a gear transmission case or housing. Members 50 and 51 have shallow gear selecting detents 55 and deep neutral detents 54 into which the dogs 52 are arranged to be urged by springs 57, said dogs having insulated studs or members 56 including wedge shaped upper ends 58 arranged to separate contact members or balls 59 when urged therebetween. Contact members 59—59 are urged together by springs 61 and 62 thereby forming a circuit between contact posts or members 63—63 secured to insulating block or housing 64 secured to cover 60.

Operation of Fig. 4

With both the gear shifter members 50 and 51 in neutral position, the dogs 53 will both be positioned in the deep detents 54 and no separation of the contact members 59 will occur. If however either one of said members 50 or 51 is moved to a gear selecting position, as shown in the drawings, one of said dogs 53 will be positioned in one of the shallow detents 55 and therefore the higher position of said dog will act to urge wedge end 58 between said contact members 59 and the circuit between binding posts 63 will be opened and therefore the starter circuit cannot be closed when button 18 is depressed, whereas if both dogs 53 are positioned in the deep detents 54 the circuit will be closed and the motor 1 started.

By supplying the manually operated switches as 26, 27 and 28 and correlated clutch operated switches 25, the applicant's system may be stocked by manufacturers of various form of motor vehicles and applied thereto as desired, the particular switch or circuit controller, as 26, 27 or 28 being opened or closed, as desired to suit the particular service or vehicle to which the system is applied or operated.

It is to be noted that in addition to the various combinations of control of the system as described by the opening and closing of circuit controllers 26, 27 and 28, other combinations of control may be accomplished by other combinations of opening and closing said circuit controllers.

The system and apparatus above illustrated and described should be construed as typical and not as limiting the invention, the scope of which is defined in the appended claims.

What I claim is:

1. The combination with a variable speed power transmission including gears shiftable between neutral and engaged power transmitting positions, and a motor connected to said transmission having a starter therefor including a circuit for energizing said starter, of power operated means for shifting said gears between said neutral and engaged positions, gear selector means supported independently of said transmission operable between a neutral and selected gear engaging positions, means controlled thereby for rendering said power operated means operative to selectively shift said gears corresponding to the operation of said gear selector means, means for energizing said starter circuit for starting said motor, and means supported by said gear selector means for preventing the energization of said circuit by said energizing means when said gear selector means has been operated to a selected engaged gear position but permit the energizing of said circuit by said energizing means when said gear selector means has been operated to said neutral position thereof.

2. The combination with a variable speed transmission including gears shiftable between neutral and selected engaged gear positions and a motor connected to said transmission having a starter for starting said motor, of power operated means operable to shift said gears between said neutral and selected engaged gear positions, gear selector means supported independently of said transmission including a manually operated gear selector operable between neutral and selected gear engaged positions, means operated thereby for rendering said power operated means operative to selectively shift said gears corresponding to the operation of said gear selector, means for energizing said starter to start said motor, and means supported by said gear selector means for permitting said starter energizing means to energize said starter when said gear selector has been operated to the neutral position thereof and prevent energization of said starter by said starter energizing means when said gear selector has been operated to a selected engaged gear position thereof.

3. The combination with a variable speed transmission including gears shiftable between neutral and selected engaged gear positions and a motor connected to said transmission having a starter for starting said motor, of power operated means operable to shift said gears between said neutral and selected gear positions, gear selector means supported independently of said transmission including a gear selector member operable between neutral and selected gear engaging positions, means operated by said member for rendering said power operated means operative to selectively shift said gears corresponding to the operation of said gear selector member, means for energizing said starter to start said motor, and means supported by said gear selector means for permitting said starter energizing means to energize said starter when said gear selector member has been operated to the neutral position thereof and prevent energization of said starter by said starter energizing means when said selector member has been operated to a selected gear engaging position thereof.

4. In combination, a variable speed power transmission including gears shiftable between neutral and selected engaged gear positions, a motor, a clutch connecting said motor and transmission, of means operable to shift said gears between said neutral and selected engaged positions, means for starting said motor, means for operating said clutch to connect and disconnect said motor and transmission, means controlled by said gear shifting means for preventing the starting of said motor by said motor starting means when said gear shifter means has shifted said gears to a selected engaged gear position and permit the starting of said motor by said motor starting means when said gear shifting means has been operated to shift said gears to the neutral position thereof, and means dependent upon the control of said motor starting means by said gear shifter means thereof for preventing the starting of said motor by said motor starting means when said clutch operating means has connected said motor and transmission and permit the starting of said motor by said motor starting means when said clutch operating means has disconnected said motor and transmission.

5. In mechanism for shifting gears and controlling the starting of motors, a motor including a circuit and starter controlled thereby for starting said motor, a gear transmission connected to said motor having gears shiftable between neutral and selected engaged gear positions, power operated means including electrically energized devices operable to shift said gears between said neutral and engaged positions, gear selector means including circuit controllers operable to supply energy to said electrically energized devices when operated to one position and cancel the supply when operated to another position, other circuit controllers for supplying energy to said starter control circuit when operated to one position and cancel said supply when operated to another position, and a gear selector member controlling said gear selector means for operating said circuit controllers from one position to the other.

6. In combination, a variable speed transmission including gears shiftable between neutral and selected engaged positions, a vehicle motor, a starter motor in a starter circuit including a source of energy for starting said vehicle motor, power operated gear shifting means operative to shift said gears between said neutral and engaged position, a gear selector unit supported independently of said transmission operative to control said power operated gear shifting means, a magnetically operated switch having the contacts thereof included in said starter circuit for connecting said source and starter motor upon energization thereof, a control circuit including said source and the winding of said magnetically operated switch, a circuit closer in said control circuit operated by said gear selector unit for opening said circuit when said selector is operated to shift said gears to engaged position and closed when said selector is operated to shift said gears to the neutral position, and starting means including a second circuit closer in said control circuit for starting said starting motor upon the closing thereof normally maintained in the open position.

7. In mechanism for shifting gears and controlling the starting of hydrocarbon motors, a hydrocarbon motor including a starter and a circuit controlling said starter for starting said motor, a gear transmission connected to said motor having gears shiftable between neutral and selected engaged gear positions, power operated means operable to shift said gears between said neutral and engaged positions, gear selector means including circuit controllers operable to supply energy to said power operated means for shifting said gears, other circuit controllers controlling said motor starter circuit for energizing and deenergizing said starter, and a gear selector member controlling said gear selector means operable between neutral and gear engaging positions for simultaneously actuating said gear selector circuit controllers and motor starter circuit controllers.

8. In mechanism for shifting gears and controlling the starting of explosive motors, an explosive motor including a starter and a circuit controlling said starter for starting said motor, a gear shifting transmission connected to said motor having gears shiftable between neutral and selected engaged gear positions, power operated means operable to shift said gears between said neutral and engaged positions, gear selector means including circuit controllers operable to supply energy to said power operated means for shifting said gears, other circuit controllers controlling said motor starter circuit for energizing and deenergizing said starter, a manually operated gear selector member operable between neutral and gear engaged positions having pivotal and axial movement for movement thereof between said positions, and means operated thereby for actuating said circuit controllers.

9. In mechanism for shifting gears and starting explosive motors, an explosive motor, means for starting said motor, a gear transmission connected to said motor having gears shiftable between neutral and selected engaged positions, power operated means for shifting said gears, a gear selector unit supported independently of said transmission operative to effect shifting of said gears by said power operated means, means including a gear selector member on said unit having pivotal movements for effecting engagement and disengagement of said gears and an axial neutral movement for selecting the gears to be engaged, a circuit including a circuit closer therein permitting operation of said starting means when said circuit closer is in closed position but preventing said operation when in open position, and means operated by said gear selector member for maintaining said circuit closer in open position during the pivotal movements of said member and closed during the axial movement thereof.

10. In mechanism for shifting gears and controlling the starting of explosive motors, an explosive motor including a circuit and a starter controlled by said circuit for starting said motor, a gear transmission connected to said motor having gears shiftable between neutral and selected engaged gear positions, power operated means for shifting said gears between said neutral and engaged positions, gear selector means including circuit controllers operable to supply energy to said power operated means for shifting said gears and other circuit controllers controlling said motor starting circuit for starting said motor, and a gear selector member controlling said gear selector means, said circuit controllers having axial movement for selecting the gears to be moved from neutral to engaged positions and a pivotal movement for moving said gears therebetween, the circuit controllers being opened and closed solely during the pivotal movement of said member.

11. In combination, a gear transmission housing, gears in said housing shiftable between neutral and engaged positions, a motor connected to said housing having a starter included in a starter circuit for starting said motor, an opening in said housing having a cover thereover, gear shift members on said cover movable to shift said gears between said neutral and engaged positions, means including reciprocating members on said cover for locking said gear shift members in either neutral or engaged positions during the movement thereof, means including a control circuit for energizing and deenergizing said starter circuit, circuit closers in said control circuit supported by said cover actuated by said reciprocating members for opening said circuit closers when said gear shift members are moved to the engaged position and closing said circuit closers when moved to the neutral position.

OSCAR A. ROSS.